US010442627B2

(12) United States Patent
Walker et al.

(10) Patent No.: US 10,442,627 B2
(45) Date of Patent: Oct. 15, 2019

(54) CHAIN CONVEYOR AND COUPLER LINK FOR SAME

(71) Applicant: Joy MM Delaware, Inc., Wilmington, DE (US)

(72) Inventors: Aaron Philip Walker, Evans City, PA (US); Christopher George Stewart, Oil City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/913,815

(22) Filed: Mar. 6, 2018

(65) Prior Publication Data

US 2018/0251310 A1  Sep. 6, 2018

Related U.S. Application Data

(60) Provisional application No. 62/467,761, filed on Mar. 6, 2017, provisional application No. 62/467,770, filed
(Continued)

(51) Int. Cl.
*B65G 19/20* (2006.01)
*B65G 17/06* (2006.01)
(Continued)

(52) U.S. Cl.
CPC ............. *B65G 19/20* (2013.01); *B65G 17/06* (2013.01); *B65G 17/26* (2013.01); *B65G 17/40* (2013.01);
(Continued)

(58) Field of Classification Search
CPC ........ B65G 19/24; B65G 19/20; B65G 17/40; B65G 17/44; B65G 23/06; B65G 17/38; B65G 17/06
(Continued)

(56) References Cited

U.S. PATENT DOCUMENTS 231,186 A    8/1880  Neacy
572,991 A   12/1896  Howard
(Continued)

FOREIGN PATENT DOCUMENTS

CN    1044627    8/1990
CN    2211981   11/1995
(Continued)

OTHER PUBLICATIONS

International Search Report with Written Opinion for Application No. PCT/US18/021224 dated Aug. 8, 2018 (10 pages).
(Continued)

*Primary Examiner* — James R Bidwell
(74) *Attorney, Agent, or Firm* — Michael Best & Friedrich LLP

(57) ABSTRACT

A conveyor chain includes a first link, a second link, and a coupler link. The first link includes a first sprocket-engaging portion and a second sprocket-engaging portion, each protruding laterally away from one another. The second link includes a first sprocket-engaging portion and a second sprocket-engaging portion, each protruding laterally away from one another. The coupler link couples the first link to the second link, and the coupler link is positioned laterally between the first sprocket-engaging portion and the second sprocket-engaging portion of each link. The coupler link includes a first joint pivotably coupled to the first link and a second joint pivotably coupled to the second link. The first joint permits pivoting movement of the first link about a plurality of axes, and the second joint permits pivoting movement of the second link about a plurality of axes.

19 Claims, 14 Drawing Sheets

US 10,442,627 B2
Page 2

Related U.S. Application Data on Mar. 6, 2017, provisional application No. 62/467,766, filed on Mar. 6, 2017, provisional application No. 62/467,773, filed on Mar. 6, 2017, provisional application No. 62/467,767, filed on Mar. 6, 2017, provisional application No. 62/467,769, filed on Mar. 6, 2017.

(51) Int. Cl.

| | |
|---|---|
| B65G 19/24 | (2006.01) |
| B65G 17/44 | (2006.01) |
| B65G 23/06 | (2006.01) |
| B65G 17/40 | (2006.01) |
| E21C 35/20 | (2006.01) |
| B65G 21/20 | (2006.01) |
| B65G 19/18 | (2006.01) |
| E21F 13/06 | (2006.01) |
| B65G 19/08 | (2006.01) |
| B65G 17/26 | (2006.01) |
| B65G 21/12 | (2006.01) |
| E21C 25/34 | (2006.01) |
| E21C 31/06 | (2006.01) |
| B65G 23/08 | (2006.01) |
| B65G 23/22 | (2006.01) |
| B65G 19/26 | (2006.01) |
| B65G 19/22 | (2006.01) |
| E21C 31/12 | (2006.01) |
| B65G 17/38 | (2006.01) |

(52) U.S. Cl.
CPC ............ *B65G 17/44* (2013.01); *B65G 19/08* (2013.01); *B65G 19/18* (2013.01); *B65G 19/205* (2013.01); *B65G 19/24* (2013.01); *B65G 21/12* (2013.01); *B65G 21/2045* (2013.01); *B65G 23/06* (2013.01); *B65G 23/08* (2013.01); *B65G 23/22* (2013.01); *E21C 25/34* (2013.01); *E21C 31/06* (2013.01); *E21C 35/20* (2013.01); *E21F 13/066* (2013.01); *B65G 17/38* (2013.01); *B65G 19/22* (2013.01); *B65G 19/26* (2013.01); *B65G 2201/045* (2013.01); *B65G 2207/48* (2013.01); *B65G 2812/0295* (2013.01); *B65G 2812/0297* (2013.01); *E21C 31/12* (2013.01)

(58) Field of Classification Search
USPC .................................. 198/728–734, 850–853
See application file for complete search history.

(56) References Cited

U.S. PATENT DOCUMENTS

| | | | |
|---|---|---|---|
| 708,924 A | 9/1902 | Scott et al. | |
| 1,008,890 A | 11/1911 | Demarest | |
| 1,020,863 A | 3/1912 | Weichseldorfer | |
| 1,153,375 A | 9/1915 | Elliott | |
| 1,427,229 A | 8/1922 | Robbins et al. | |
| 1,699,334 A | 1/1929 | Petersen | |
| 1,869,050 A | 7/1932 | Coppage | |
| 2,222,025 A | 11/1940 | Fischer | |
| 2,386,619 A | 10/1945 | Long et al. | |
| 2,450,501 A | 10/1948 | Clarkson | |
| 2,674,365 A | 4/1954 | Russell | |
| 2,754,957 A | 7/1956 | Dodson | |
| 2,761,548 A | 9/1956 | Long | |
| 2,784,836 A | 3/1957 | Tourneau | |
| 3,005,358 A | 10/1961 | Gandrud | |
| 3,103,275 A | 9/1963 | Rollins | |
| 3,119,276 A | 1/1964 | Pearson | |
| 3,145,576 A * | 8/1964 | Proctor | F16G 13/10 299/83.1 |
| 3,225,897 A | 12/1965 | Rollins | |
| 3,324,990 A | 6/1967 | Karlovsky, Jr. | |
| 3,452,228 A | 6/1969 | Woolley | |
| 3,540,566 A | 11/1970 | Perry et al. | |
| 3,602,364 A | 8/1971 | Maglio et al. | |
| 4,037,713 A | 7/1977 | Soliman et al. | |
| 4,175,797 A | 11/1979 | Krekeler | |
| 4,202,219 A | 5/1980 | Weis | |
| 4,218,932 A | 8/1980 | McComber | |
| 4,238,028 A | 12/1980 | Lake | |
| 4,461,372 A | 7/1984 | Bekkala et al. | |
| 4,585,117 A | 4/1986 | Hahn | |
| 4,766,995 A | 8/1988 | Sterwerf, Jr. | |
| 4,844,314 A | 4/1989 | Wilson, III | |
| 4,899,868 A | 2/1990 | Johnson | |
| 4,917,658 A | 4/1990 | Sugimoto et al. | |
| 4,964,344 A | 10/1990 | Robinson | |
| 5,000,310 A | 3/1991 | Edmondson | |
| 5,056,651 A | 10/1991 | Nagamatsu | |
| 5,088,594 A | 2/1992 | Edmondson | |
| 5,096,048 A | 3/1992 | Lachner et al. | |
| 5,156,256 A | 10/1992 | David | |
| 5,165,766 A | 11/1992 | Thomas | |
| 5,177,949 A | 1/1993 | Stadele et al. | |
| 5,186,526 A | 2/1993 | Pennington | |
| 5,213,199 A | 5/1993 | Braun et al. | |
| 5,226,526 A | 7/1993 | O'Brien | |
| 5,305,872 A | 4/1994 | Hutton | |
| 5,628,393 A | 5/1997 | Steeber | |
| 5,669,680 A | 9/1997 | Bertoni | |
| 5,762,424 A * | 6/1998 | Harris | F16C 23/045 384/299 |
| 6,640,534 B1 | 11/2003 | Harnaes et al. | |
| 6,662,932 B1 | 12/2003 | O'Neill | |
| 7,036,657 B1 | 5/2006 | Robinson | |
| 7,118,648 B2 | 10/2006 | Dever et al. | |
| 7,422,256 B2 | 9/2008 | Mueller | |
| 7,438,180 B2 | 10/2008 | Taylor et al. | |
| 7,442,139 B2 | 10/2008 | Kubo et al. | |
| 7,997,402 B2 | 8/2011 | Merten et al. | |
| 8,016,102 B2 | 9/2011 | Morris | |
| 8,038,558 B2 | 10/2011 | Klabisch et al. | |
| 8,141,696 B2 | 3/2012 | O'Neill | |
| 8,177,049 B2 | 5/2012 | O'Neill | |
| 8,360,912 B2 | 1/2013 | Klabisch et al. | |
| 8,448,781 B2 | 5/2013 | Morris | |
| 8,453,826 B2 | 6/2013 | Morris | |
| 8,672,110 B2 | 3/2014 | Jaeger | |
| 8,936,146 B2 | 1/2015 | Morris | |
| 8,950,571 B2 | 2/2015 | O'Neill | |
| 8,978,877 B2 | 3/2015 | O'Neill | |
| 9,227,787 B2 | 1/2016 | Morris et al. | |
| 9,284,124 B2 | 3/2016 | Klingbeil | |
| 9,415,939 B2 | 8/2016 | Arnold et al. | |
| 9,434,428 B2 | 9/2016 | Hakes et al. | |
| 9,487,358 B2 | 11/2016 | Morris et al. | |
| 10,106,325 B2 * | 10/2018 | Walker | B65G 19/18 |
| 10,150,617 B2 | 12/2018 | O'Neill | |
| 2002/0050442 A1 | 5/2002 | Malitzki | |
| 2002/0129732 A1 | 9/2002 | Marshall | |
| 2004/0140182 A1 | 7/2004 | Morris | |
| 2005/0176539 A1 | 8/2005 | Hirschmann | |
| 2005/0027459 A1 | 12/2005 | Kwiat | |
| 2005/0274590 A1 | 12/2005 | Kwiat | |
| 2006/0058144 A1 | 3/2006 | Lacerda | |
| 2006/0172841 A1 | 8/2006 | Nunez et al. | |
| 2007/0107412 A1 | 5/2007 | Humcke et al. | |
| 2008/0011588 A1 | 1/2008 | Frost et al. | |
| 2009/0218199 A1 | 9/2009 | Russell | |
| 2009/0250318 A1 | 10/2009 | O'Neill | |
| 2009/0277757 A1 | 11/2009 | Boudreau | |
| 2009/0318239 A1 | 12/2009 | Kampf | |
| 2010/0276254 A1 | 11/2010 | O'Neill | |
| 2011/0067793 A1 | 3/2011 | Nukushina | |
| 2011/0067980 A1 | 3/2011 | Martin | |
| 2011/0088367 A1 * | 4/2011 | Powell | F16G 13/12 59/90 |

(56) References Cited

U.S. PATENT DOCUMENTS

| | | |
|---|---|---|
| 2011/0315521 A1 | 12/2011 | O'Neill |
| 2012/0048684 A1 | 3/2012 | Morris |
| 2013/0203539 A1 | 8/2013 | Kirchner et al. |
| 2013/0227833 A1 | 9/2013 | Rizzo |
| 2013/0284569 A1 | 10/2013 | Studer |
| 2013/0334015 A1 | 12/2013 | Lasecki |
| 2014/0027247 A1 | 1/2014 | Cox et al. |
| 2014/0116850 A1 | 5/2014 | Musick et al. |
| 2014/0239699 A1 | 8/2014 | O'Neill |
| 2014/0332354 A1* | 11/2014 | Morris .................. B65G 19/08 198/852 |
| 2015/0008101 A1 | 1/2015 | Miglava |
| 2015/0101912 A1 | 4/2015 | Morris et al. |
| 2015/0191313 A1 | 7/2015 | Arnold et al. |
| 2015/0266527 A1 | 9/2015 | Akinlua et al. |
| 2015/0353152 A1 | 12/2015 | Hakes et al. |
| 2016/0159417 A1 | 6/2016 | Zimmer et al. |
| 2016/0200520 A1 | 7/2016 | Menke et al. |
| 2017/0137226 A1 | 5/2017 | Morris et al. |

FOREIGN PATENT DOCUMENTS

| | | |
|---|---|---|
| CN | 1517280 | 8/2004 |
| CN | 201087012 | 7/2008 |
| CN | 101602433 | 12/2009 |
| CN | 101875433 | 11/2010 |
| DE | 3151059 | 7/1983 |
| DE | 19633298 | 2/1998 |
| DE | 20300239 | 3/2003 |
| EP | 1197671 | 4/2002 |
| EP | 2147875 | 1/2010 |
| EP | 2221495 | 8/2010 |
| EP | 2436944 | 4/2012 |
| GB | 205440 | 10/1923 |
| GB | 658623 | 10/1951 |
| GB | 671424 | 5/1952 |
| GB | 2458768 | 10/2009 |
| JP | 05576263 | 8/2014 |
| RU | 2064393 | 7/1996 |
| SU | 963922 | 10/1982 |
| WO | WO9008716 | 8/1990 |
| WO | WO03013987 | 2/2003 |
| WO | WO2012054775 | 4/2012 |

OTHER PUBLICATIONS

Bureau of Mines United States Department of the Interior, "Noise Study of Longwall Mining Systems", Jan. 1986, Contract JO188072, Wyole Laboratories, cover page, p. 3, pp. 131-137 (9 pages).
Leikin A. E., Rodin B.1., "Adhesive Materials", Material Sciences. M., High School, 1971, p. 405, http://www.nglib.ru/book_view.jsp?idn=016470&page=405&format=free.

* cited by examiner

CHAIN CONVEYOR AND COUPLER LINK FOR SAME

CROSS-REFERENCE TO RELATED APPLICATIONS

This application claims the benefit of prior-filed, U.S. Provisional Patent Application No. 62/467,761, filed Mar. 6, 2017; U.S. Provisional Patent Application No. 62/467,766, filed Mar. 6, 2017; U.S. Provisional Patent Application No. 62/467,767, filed Mar. 6, 2017; U.S. Provisional Patent Application No. 62/467,769, filed Mar. 6, 2017; U.S. Provisional Patent Application No. 62/467,770, filed Mar. 6, 2017; and U.S. Provisional Patent Application No. 62/467,773, filed Mar. 6, 2017. The entire contents of each of these documents are incorporated by reference herein.

BACKGROUND

The present disclosure relates to material conveyors, and particularly to chain and flight conveyors.

SUMMARY

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets.

In one independent aspect, a conveyor chain includes a first link, a second link, and a coupler link. The first link includes a first sprocket-engaging portion and a second sprocket-engaging portion, the first sprocket-engaging portion and the second sprocket-engaging portion each protruding laterally away from one another. The second link includes a first sprocket-engaging portion and a second sprocket-engaging portion, the first sprocket-engaging portion and the second sprocket-engaging portion of the second link each protruding laterally away from one another. The coupler link couples the first link to the second link, and the coupler link is positioned laterally between the first sprocket-engaging portion and the second sprocket-engaging portion of each link. The coupler link defines a first joint pivotably coupled to the first link and a second joint pivotably coupled to the second link. The first joint permits pivoting movement of the first link about a plurality of axes, and the second joint permits pivoting movement of the second link about a plurality of axes.

In another independent aspect, a coupler link is provided for a conveyor chain including a first link and a second link. The coupler link includes a first end, a second end, a first leg extending between the first end and the second end, a second leg extending between the first end and the second end, parallel to the first leg, a first bearing, and a second bearing. The first bearing is positioned adjacent the first end and supports a first pin for pivoting movement about a plurality of axes relative to the first end. The first pin is configured to be coupled to the first link. The second bearing is positioned adjacent the second end and supports a second pin for pivoting movement about a plurality of axes relative to the second end. The second pin configured to be coupled to the second link.

In yet another independent aspect, a coupler link is provided for a conveyor chain including a first link and a second link. The coupler link includes a first end, a second end, a first leg extending between the first end and the second end, a second leg extending between the first end and the second end, parallel to the first leg, and a gusset connecting the first leg and the second leg and positioned between the first end and the second end. The gusset is oriented at an oblique angle relative to a longitudinal axis extending between the first end and the second end.

In still another independent aspect, a conveyor chain includes a first link, a second link, and a coupler link. The first link includes a first sprocket-engaging portion and a second sprocket-engaging portion, and the first sprocket-engaging portion and the second sprocket-engaging portion each protrude laterally away from one another. The first link further includes at least one first end surface. The second link includes a first sprocket-engaging portion and a second sprocket-engaging portion, and the first sprocket-engaging portion and the second sprocket-engaging portion of the second link each protrude laterally away from one another. The second link further includes at least one second end surface. The coupler link is positioned laterally between the first sprocket-engaging portion and the second sprocket-engaging portion of each link. The coupler link includes a first joint pivotably coupled to the first link and a second joint pivotably coupled to the second link. One of the at least one second end surface contacts one of the at least one first end surface when at least one of the first link and the second link pivots through a predetermined angle.

Other aspects will become apparent by consideration of the detailed description and accompanying drawings.

Figure 1:
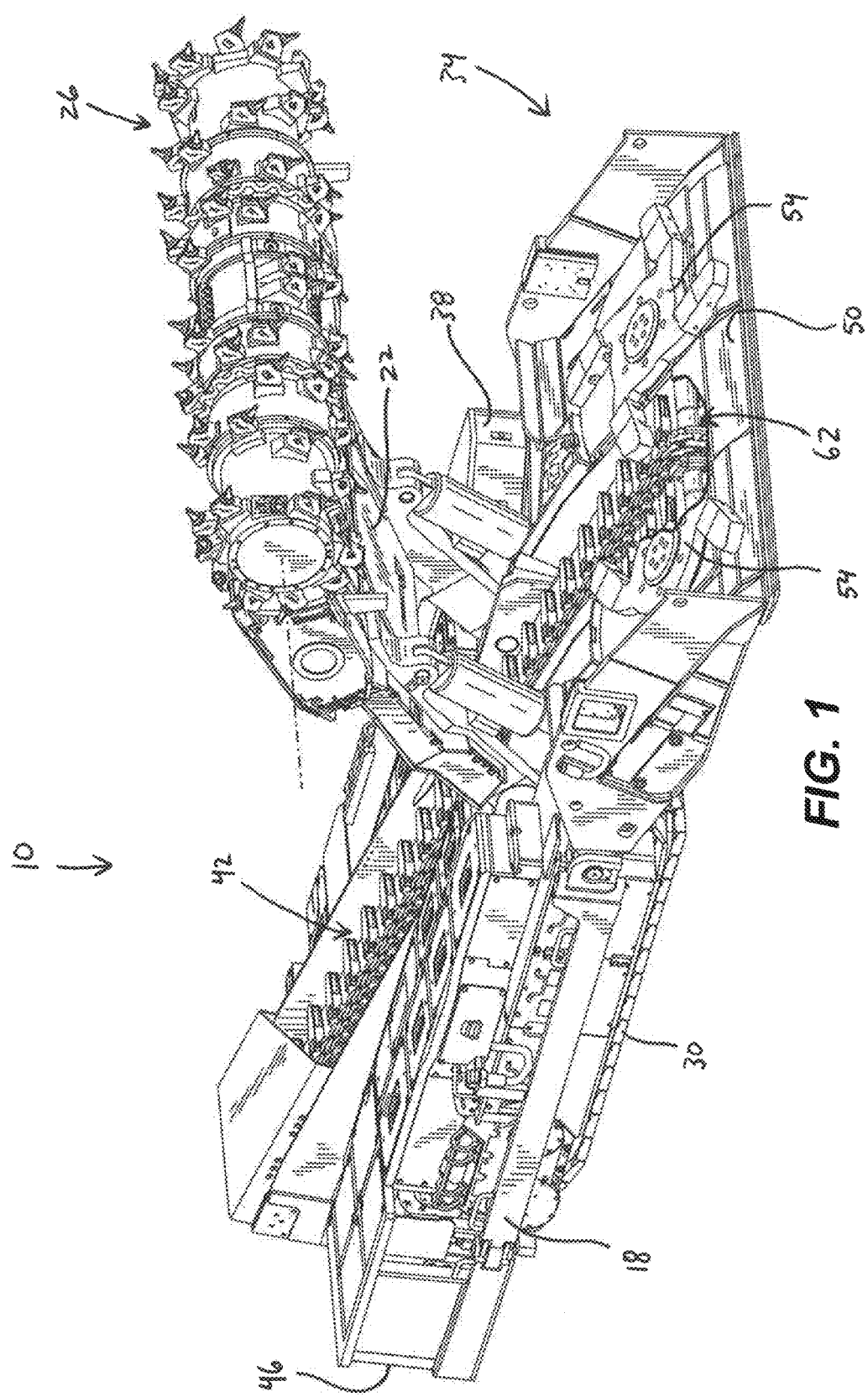
FIG. 1 is a perspective view of a mining machine with a portion of a gathering head cutaway.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect. Also, electronic communications and notifications may be performed using any known means including direct connections, wireless connections, etc.

DETAILED DESCRIPTION

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

Figure 2:
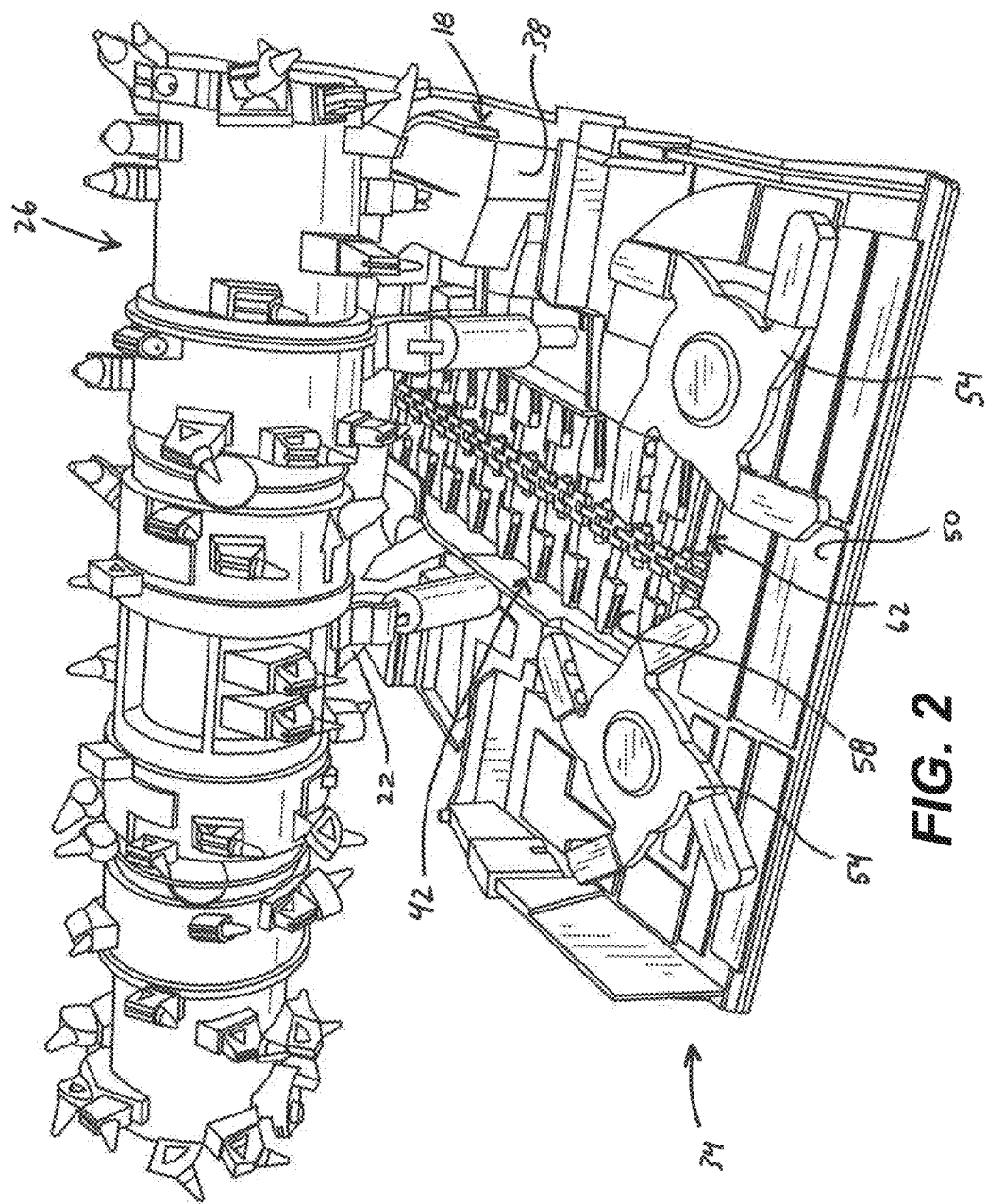
FIG. 2 is a perspective view of a forward end of the mining machine of FIG. 1.

As shown in FIGS. 1 and 2, a collecting mechanism or gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a pair of rotating arms 54 that engage and direct dislodged material onto the conveyor 42. The conveyor 42 transports the cut material from the forward end 38 toward the rear end 46 (FIG. 1) of the chassis 18, from the area below the cutter head 26 to another conveyor or a haulage machine (not shown) positioned proximate the rear end 46 of the chassis 18.

Figure 3:
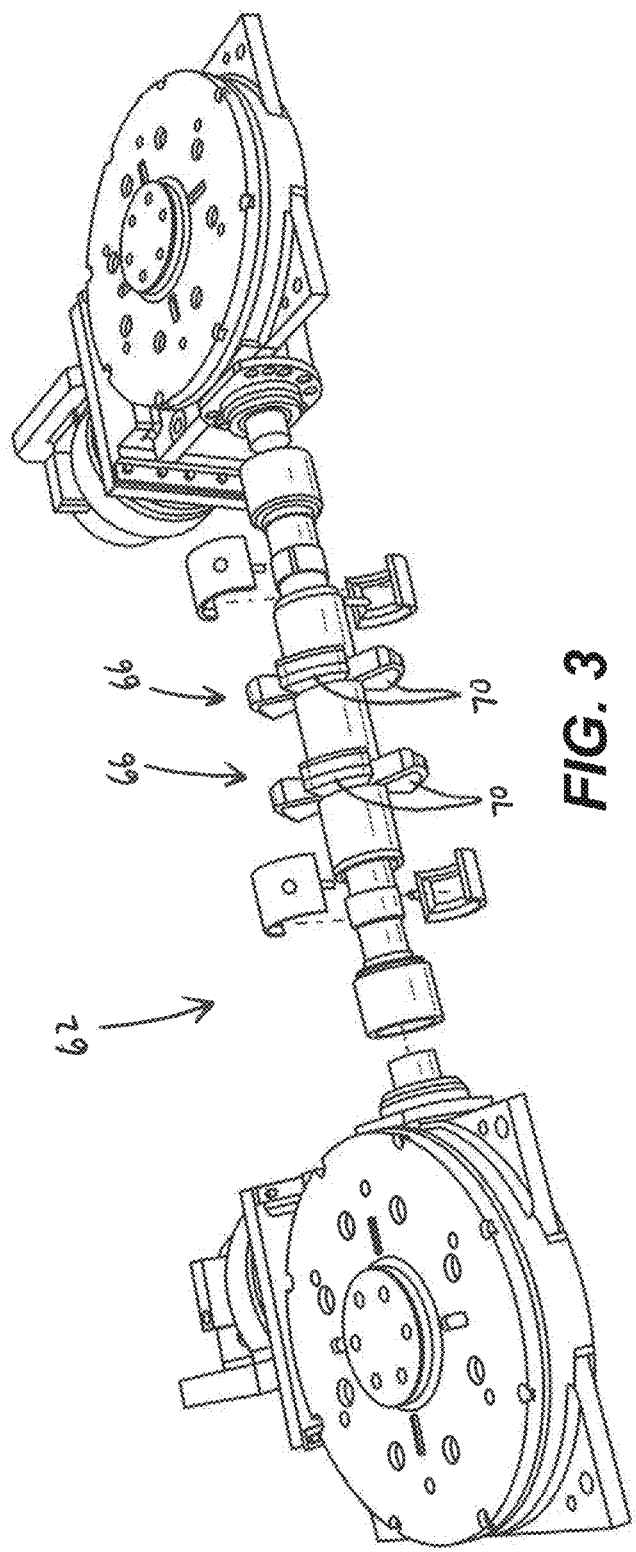
FIG. 3 is an exploded view of a conveyor drive assembly.

As shown in FIG. 2, the conveyor 42 is a chain conveyor formed by chain link connected sequentially in a continuous loop. The conveyor 42 drives cut material along a chain pan or deck 58. The conveyor 42 is driven by a drive assembly including a shaft 62 positioned adjacent the gathering head 34 of the chassis 18. As shown in FIG. 3, the shaft 62 is oriented laterally relative to the chassis 18 (FIG. 2) and is driven (e.g., by one or more motors) to rotate relative to the chassis 18. A pair of sprockets 66 engage and move the conveyor 42. In the illustrated embodiment, each sprocket 66 includes four teeth or lobes 70 spaced apart about the shaft 62, and recesses between the lobes 70 receive and drive the conveyor 42.

Figure 4:
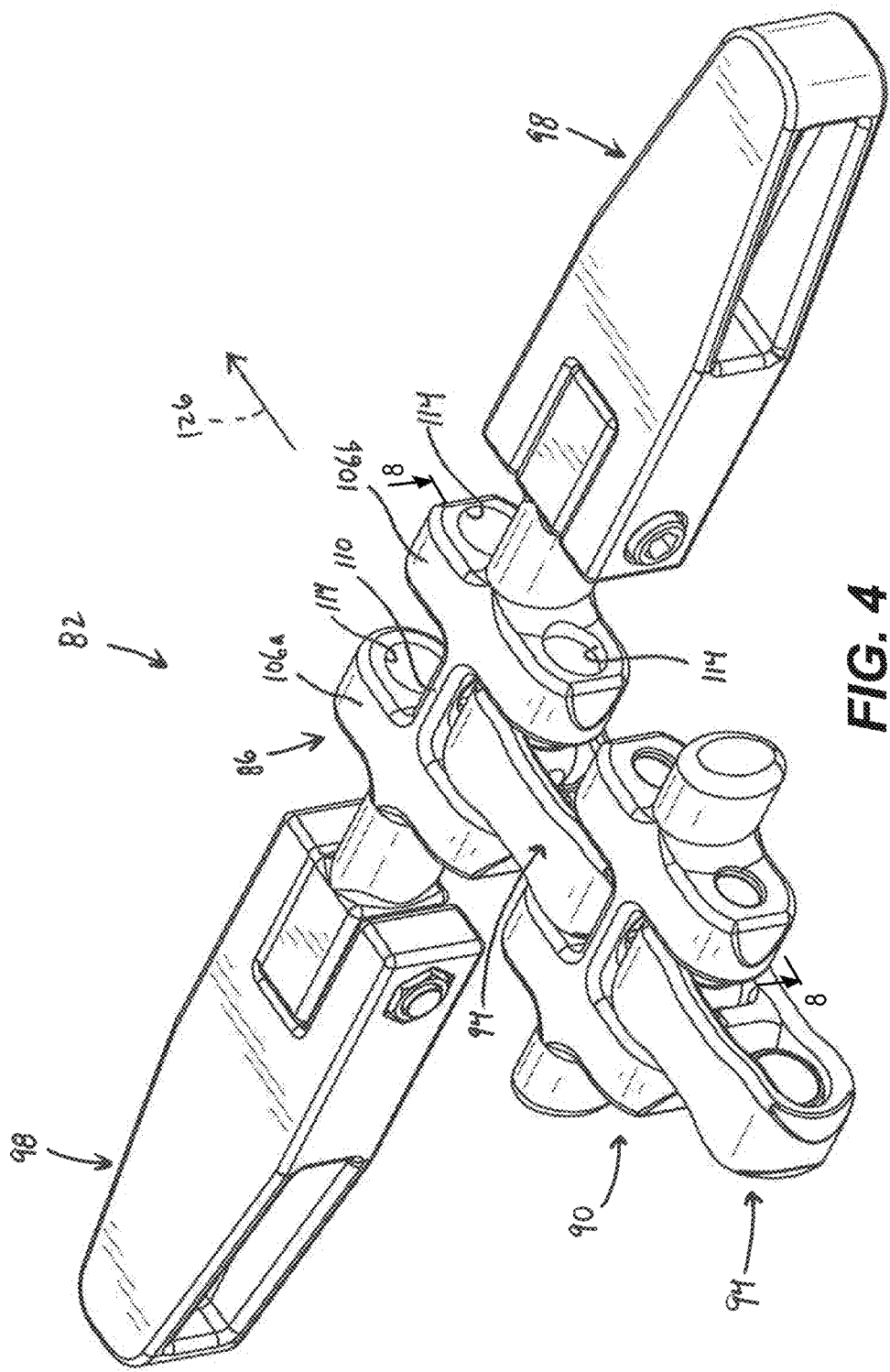
FIG. 4 is a perspective view of a chain conveyor unit.
Figure 5:
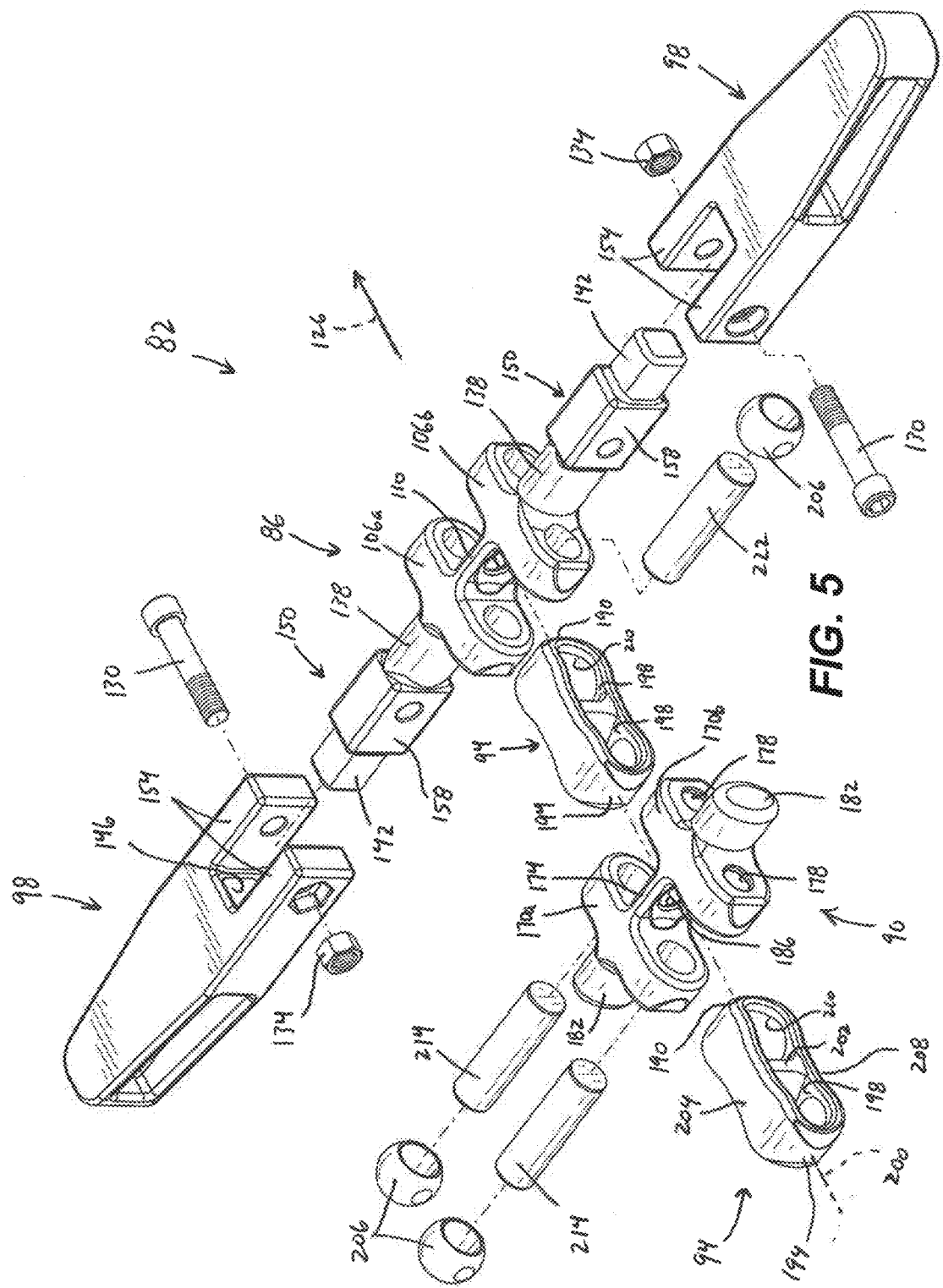
FIG. 5 is an exploded view of the chain conveyor unit of FIG. 4.

FIGS. 4 and 5 show a unit of the chain 82 that forms the conveyor 42. In the illustrated embodiment, the chain 82 includes a first link or flight link 86, a second link or connecting link 90, a coupler link or swivel link 94 coupling the flight link 86 to the connecting link 90, and flights or flight bars 98 positioned laterally outward from the flight link 86. Another swivel link 94 may couple the connecting link 90 to another flight link (not shown), and the conveyor chain 82 may therefore include a sequence of alternating flight links and connecting links, each joined to one another by swivel links. In other embodiments, the chain 82 may include a different sequence of links—for example, multiple connecting links may be positioned between one flight link and the subsequent flight link. Various permutations of the link sequence are possible.

In the illustrated embodiment, the flight link 86 includes a pair of lugs or side portions 106 (a first side portion 106a and a second side portion 106b) and a bridge 110 extending between inner surfaces of the side portions 106. Each side portion 106 includes a pair of apertures 114 extending through the inner surface and an outer surface of each side portion 106.

As best shown in FIG. 5, the flight link 86 further includes a pair of flight pins 122, and each flight pin 122 extends outwardly from the outer surface of one of the side portions 106. In the illustrated embodiment, the flight pins 122 are aligned with one another (i.e., along a common axis), and each of the flight pins 122 is positioned between the chain pins 222 (described in further detail below). Stated another way, the flight pins 122 extend laterally or transversely relative to a direction of travel 126 of the conveyor 42. Each of the flight pins 122 is positioned between the apertures 114 of the associated side portion 160. In the illustrated embodiment, each flight bar 98 is removably coupled to one of the flight pins 122 (e.g., by a threaded bolt 130 and nut 134). A sprocket-engaging portion or drive portion 138 of each flight pin 122 is positioned between the side portion 106 and the associated flight bar 98. In the illustrated embodiment, an end portion 142 of each flight pin 122 is positioned within an opening 146 of one of the flight bars 98.

As shown in FIG. 5, each connecting link 90 includes a pair of lugs or side portions 170 (a first side portion 170a and a second side portion 170b) and a bridge 174 extending between inner surfaces of the side portions 170. Each side portion 170 includes a pair of apertures 178 extending through the inner surface and an outer surface of each side portion 170. In addition, a drive pin 182 extends outwardly from an outer surface of each side portion 170. Stated another way, each drive pin 182 extends laterally or transversely relative to the direction of travel 126 of the chain 82. Each drive pin 182 is positioned between the apertures 178 of the associated side portion 170. The sprockets 66 (FIG. 3) engage the drive pins 182 and the drive portions 138 of the flight pins 122 to drive the chain 82. In the illustrated embodiment, the bridge 174 of the connecting link 90 includes an opening 186.

Figure 6:
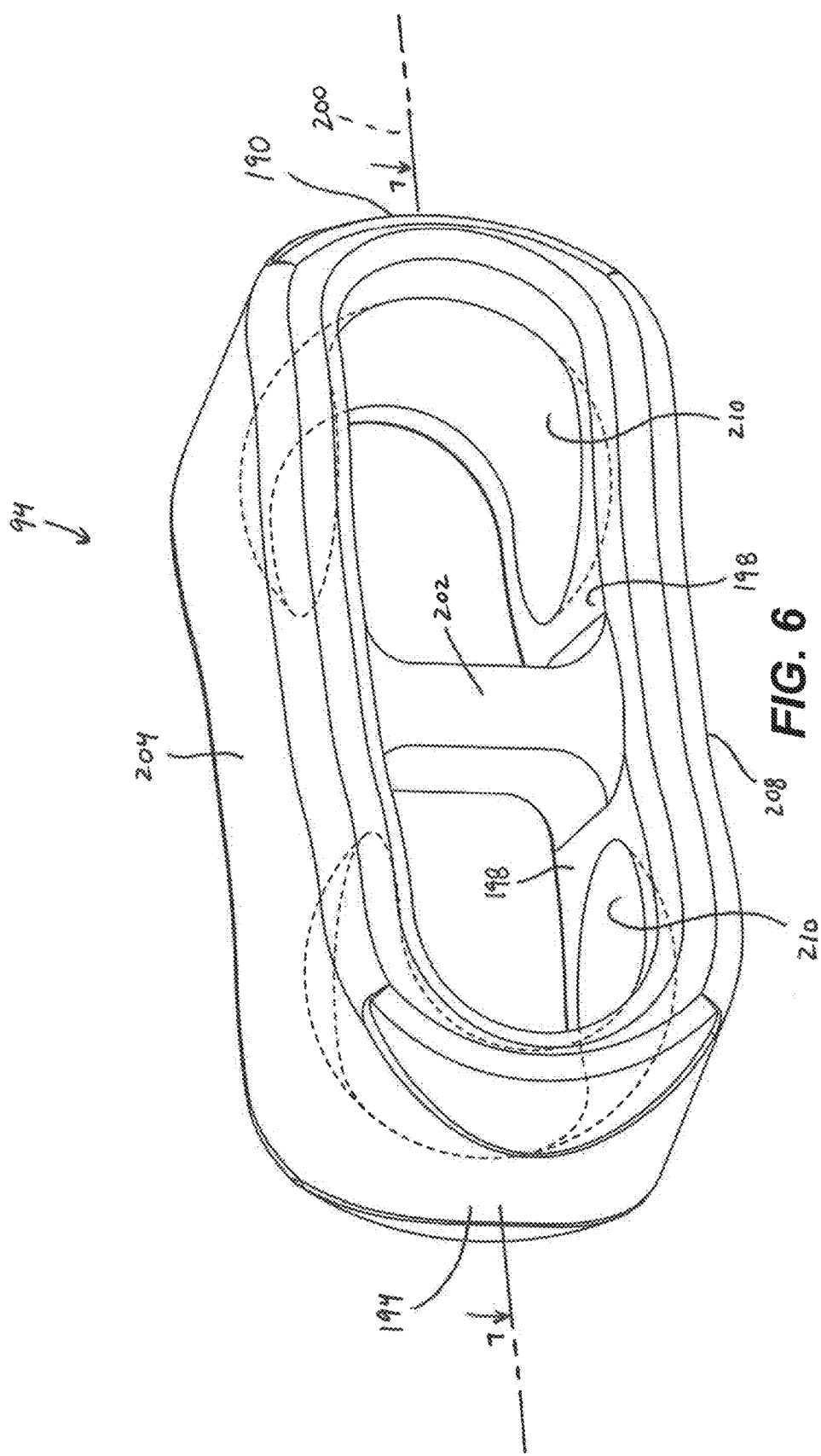
FIG. 6 is a perspective view of a swivel link.
Figure 7:
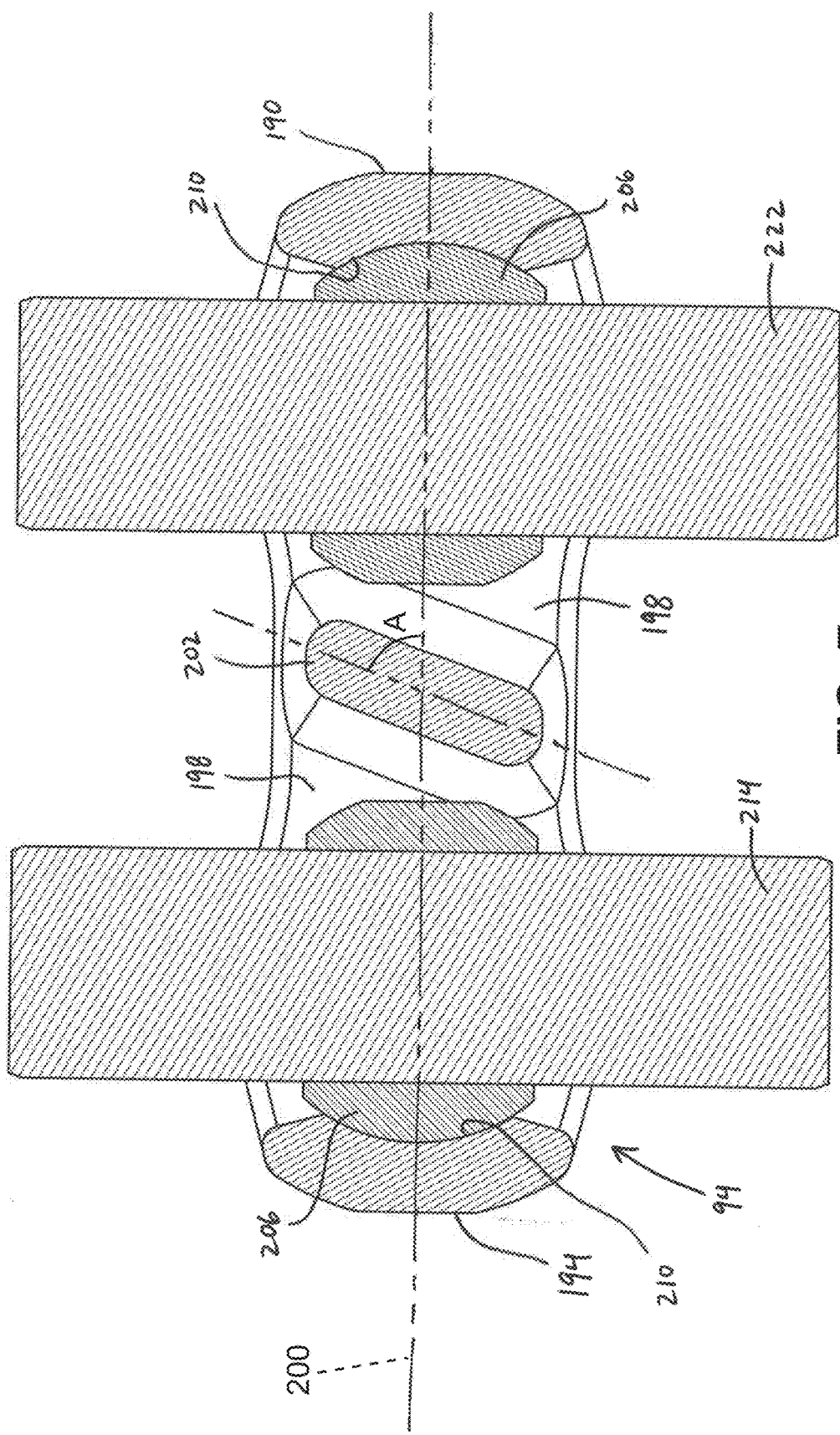
FIG. 7 is a section view of the swivel link of FIG. 6 viewed along section 7-7.

Referring now to FIGS. 5-7, the swivel link 94 includes a first end 190, a second end 194, and a pair of openings 198 extending laterally from one side of the swivel link 94 to another opposite side of the swivel link 94. A swivel link longitudinal axis 200 extends between the first end 190 and the second end 194. Under nominal operating conditions, the swivel link longitudinal axis 200 is aligned with the direction of travel 126 (FIG. 5) of the chain 82. In the illustrated embodiment, the swivel link 94 is formed as a vertical open chain link in which the openings 198 are separated by a gusset or reinforcement member 202. The reinforcement member 202 extends between a first or upper wall 204 and a second or lower wall 208 of the swivel link 94. Each swivel link 94 further includes a pair of support members or bearings, such as spherical bearings 206. Each bearing 206 is positioned in a pocket 210 (FIG. 5) formed in an associated one of the openings 198 of the swivel link 94.

Figure 8:
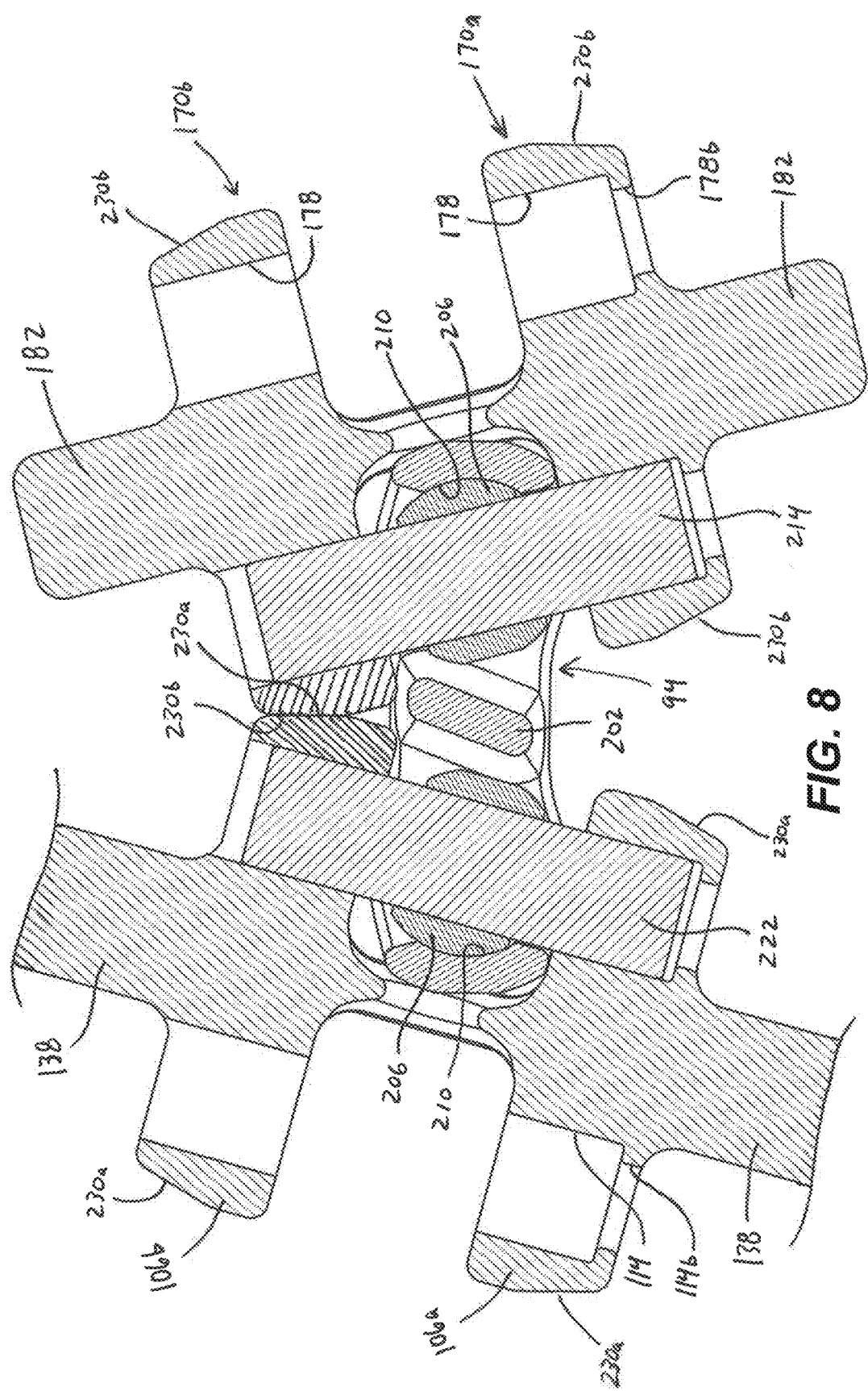
FIG. 8 is a section view of a portion of a chain conveyor unit of FIG. 4 viewed along section 8-8.

As best shown in FIG. 8, the reinforcement member 202 is oriented at an oblique angle relative to the swivel link longitudinal axis 200. In the illustrated embodiment, the reinforcement member 202 is oriented in a plane forming an acute angle A relative to the swivel link longitudinal axis 200. In some embodiments, the angle A is between approximately 40 degrees and approximately 80 degrees. In some embodiments, the angle A is between approximately 60 degrees and approximately 75 degrees. In some embodiments, the angle A is approximately 70 degrees. Stated another way, an edge of the reinforcement member 202 adjacent one side of the swivel link 94 is positioned closer to the first end 190 than the second end 194, while an edge adjacent the other side of the swivel link 94 is positioned closer to the second end 194 than the first end 190.

The reinforcement member 202 increases the strength and stiffness of the swivel link 94 between the upper wall 204 and the lower wall 208 (i.e., in a vertical direction) and distributes stress between the upper wall 204 and lower wall 208. The reinforcement also reduces sound resonance, resulting in a higher frequency and lower amplitude sound than un-reinforced or open loop links.

Referring again to FIGS. 5 and 7, the swivel link 94 further includes a pair of spherical bearings 206, with each bearing 206 positioned in one of the openings 198. In the illustrated embodiment, each spherical bearings 206 is formed as a spherical bushing including a spherical outer surface 250 (FIG. 12) and a cylindrical inner surface 254 for receiving the chain pins 214, 222. Each opening 198 of the swivel link 94 includes a spherical recess 210 (FIGS. 6 and 7) receiving one of the spherical bearings 206. Due to the angled orientation of the reinforcement member 202, one spherical bearing 206 may be inserted into a respective opening 198 from each side of the swivel link 94. In addition to permitting spherical movement of the spherical bearings 206, the spherical recesses 210 reduce the contact stress in the swivel link 94 and increase the service life of the swivel link 94. The spherical recesses 210 permit the swivel link 94 to be formed as a unitary or single piece, significantly increasing the load capacity of the chain 82.

As shown in FIG. 5, one of the openings 198 is aligned with parallel apertures 178 in the side portions 170 of the connecting link 90, while the other opening 198 is aligned with parallel apertures 114 in the side portions 106 of the flight link 86. A first connecting pin or first chain pin 214 is inserted through the apertures 178 of the connecting link side portions 170 and through one opening 198 of the swivel link 94, thereby coupling the swivel link 94 to the connecting link 90. Similarly, a second connecting pin or second chain pin 222 is inserted through the apertures 114 of the flight link side portions 106 and through the other opening 198 of the swivel link 94, thereby coupling the swivel link 94 to the flight link 86. Each of the chain pins 214, 222 is supported for pivoting movement relative to the swivel link 94 by one of the bearings 206 positioned in the connected swivel link 94.

In addition, in the illustrated embodiment, the first chain pin 214 is inserted through the connecting link side portions 170 in a first lateral direction, while the second chain pin 222 is inserted through the flight link side portions 106 in a second lateral direction opposite the first lateral direction. The chain pins 214, 222 are secured against movement relative to the connecting link 90 and the flight link 86 by retainers (e.g., self-locking retaining rings—not shown). Also, in some embodiments, an outer side of one of the side portions 170 may include an aperture 178b having a reduced diameter; as a result, each pin 214 can only be inserted from one side of the connecting link 90 to the other. The flight pin apertures 114 may be structured in a similar manner.

As shown in FIGS. 7 and 8, each chain pin 214, 222 is supported for pivoting movement relative to the swivel link 94 by one of the spherical bearings 206. Unlike conventional chains, the swivel link 94 provides multiple points of lateral articulation. The lateral pivot angle is split or distributed between separate joints, thereby reducing the range of movement for each joint and reducing the wear on the interfaces between the moving parts. Furthermore, as shown in FIG. 8, the ends of the side portions 170 of the connecting link 90 include limit surfaces 230b that contact corresponding limit surfaces 230a on an adjacent link (e.g., a flight link 86) to prevent hyperextension of the chain 82 and prevent contact between the connecting link 90 and the swivel link 94. The limit surfaces 230 permit the desired articulation, but reduce stress between connected links 90, 94 during a contact condition. Although FIG. 8 illustrates a flight link 86 and a connecting link 90 connected by a swivel link 94, it is understood that the swivel link 94 may connect a connecting link 90 and another connecting link 90, and similar limit surfaces 230 may be integrated onto the side portions of each link.

Figure 9:
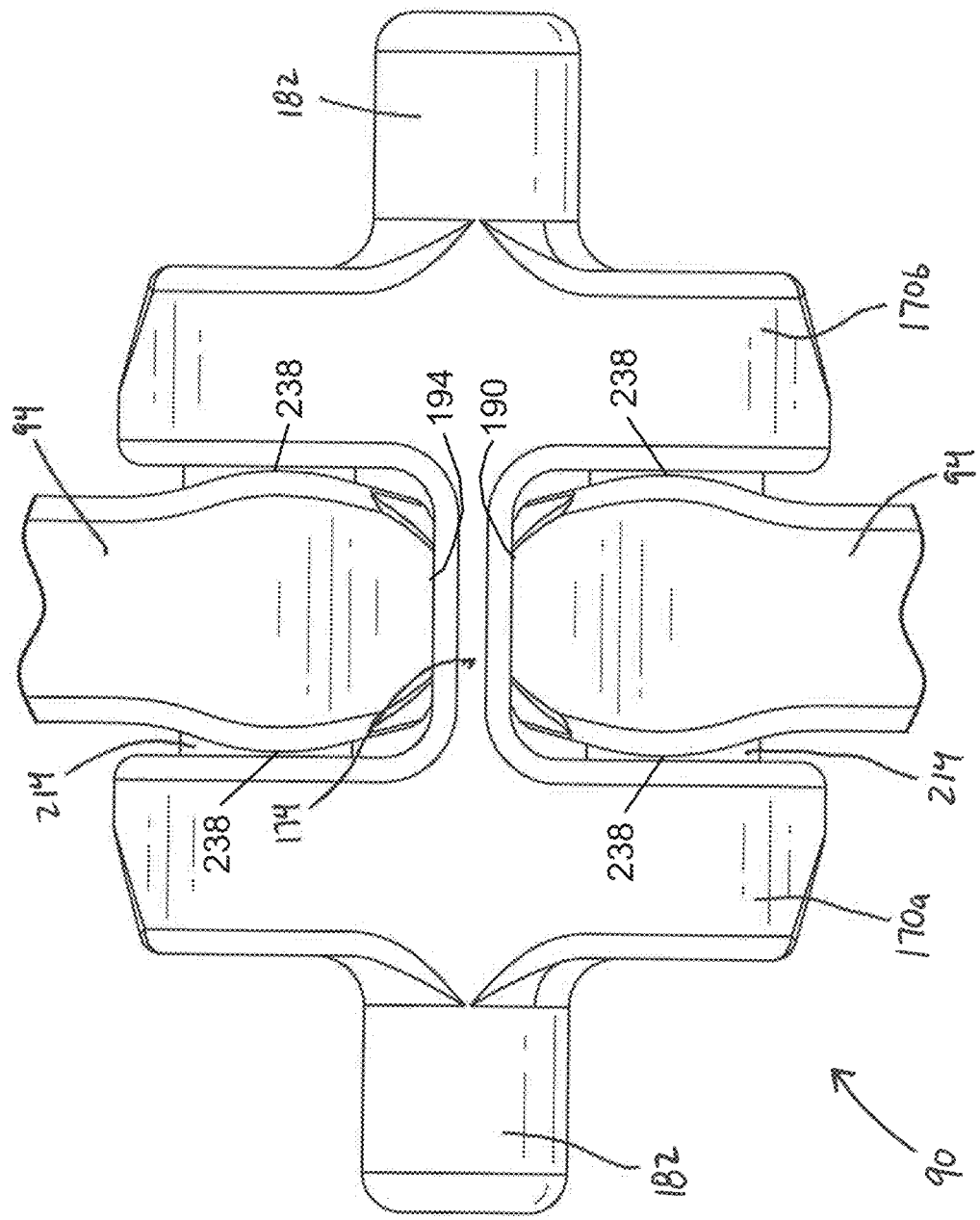
FIG. 9 is a plan view of a portion of the chain conveyor unit of FIG. 4.

Also, as shown in FIG. 9, each lateral or side surface of each end of the swivel link 94 includes a convex curved profile 238 that is shorter than a width of the pocket defined between the two side portions 170. The curved outer profile of the side surface 238 permits the swivel link 94 to articulate relative to the connecting link 90, but limits lateral translational movement of the swivel link 94 relative to the connecting link 90. In conventional chains, clearance between the links, although necessary to permit articulation, may also allow axial movement of the link and result in uneven loading and wear on pins connecting the links. The convex outer profile 238 on the lateral surfaces of the swivel link 94 limits translational movement to keep the swivel link 94 substantially centered relative to adjacent flight links 86 and connecting links 90.

Figure 10:
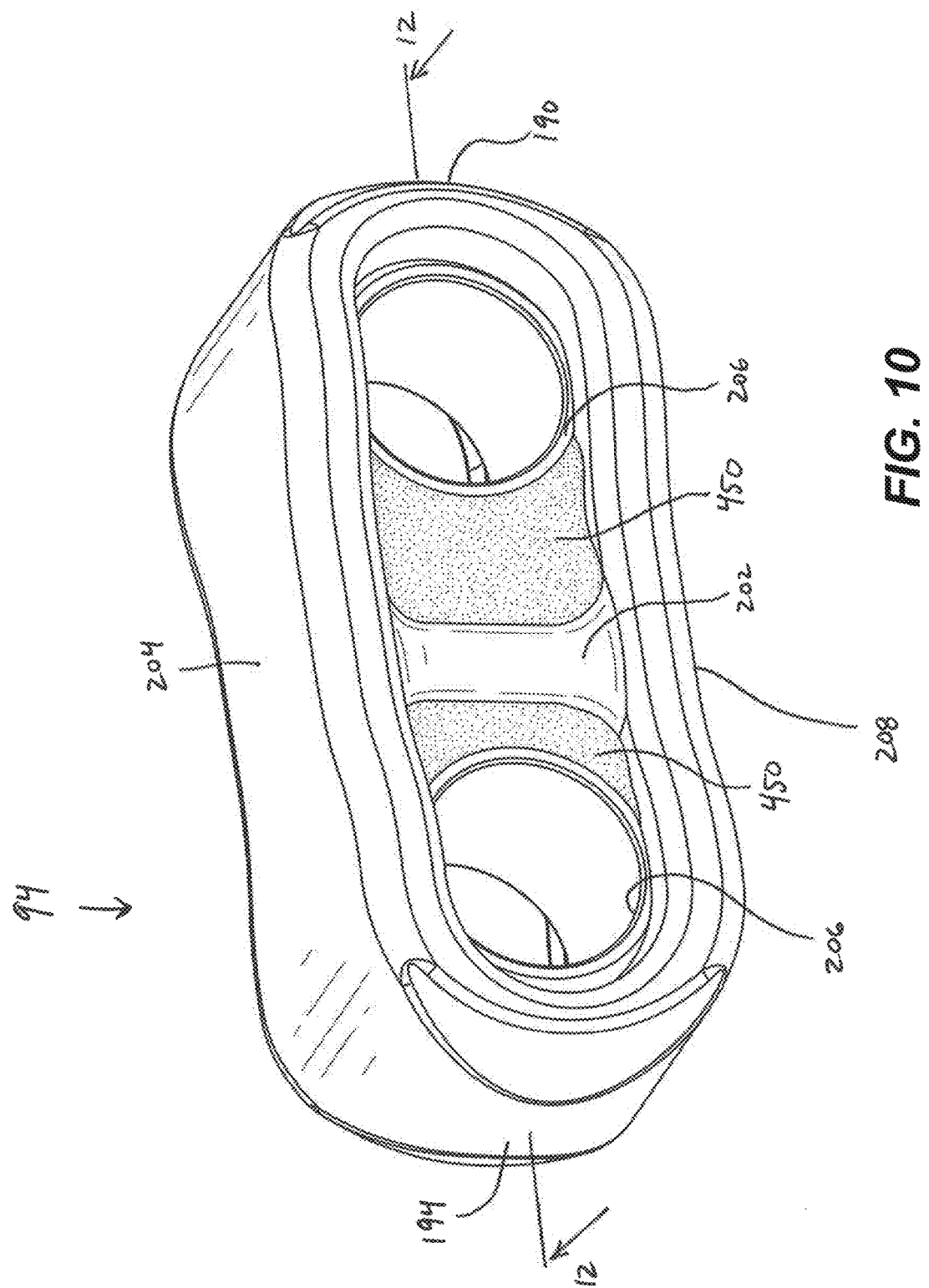
FIG. 10 is a perspective view of a swivel link including solid lubricant.
Figure 11:
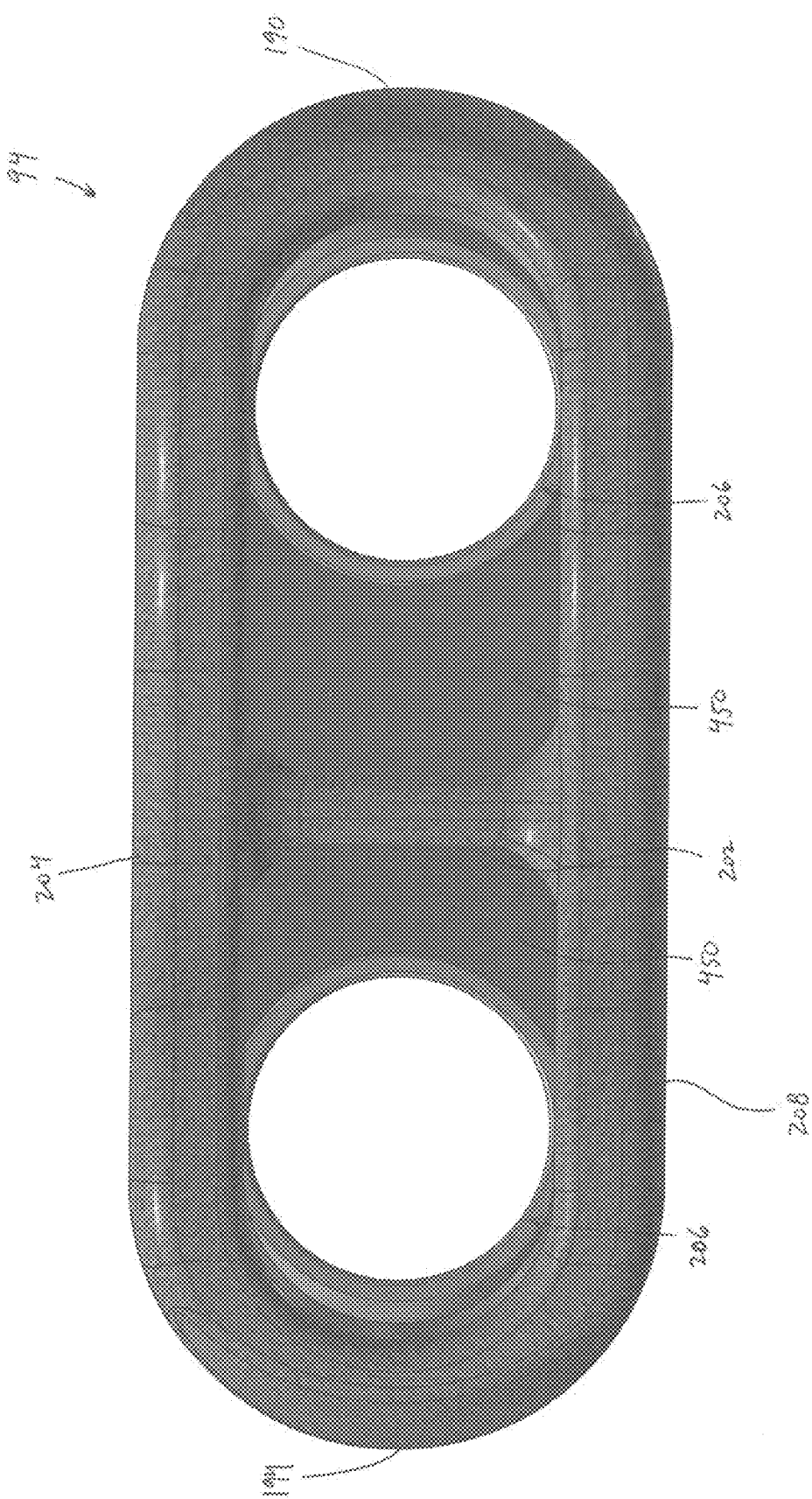
FIG. 11 is a side view of the swivel link of FIG. 10.
Figure 12:
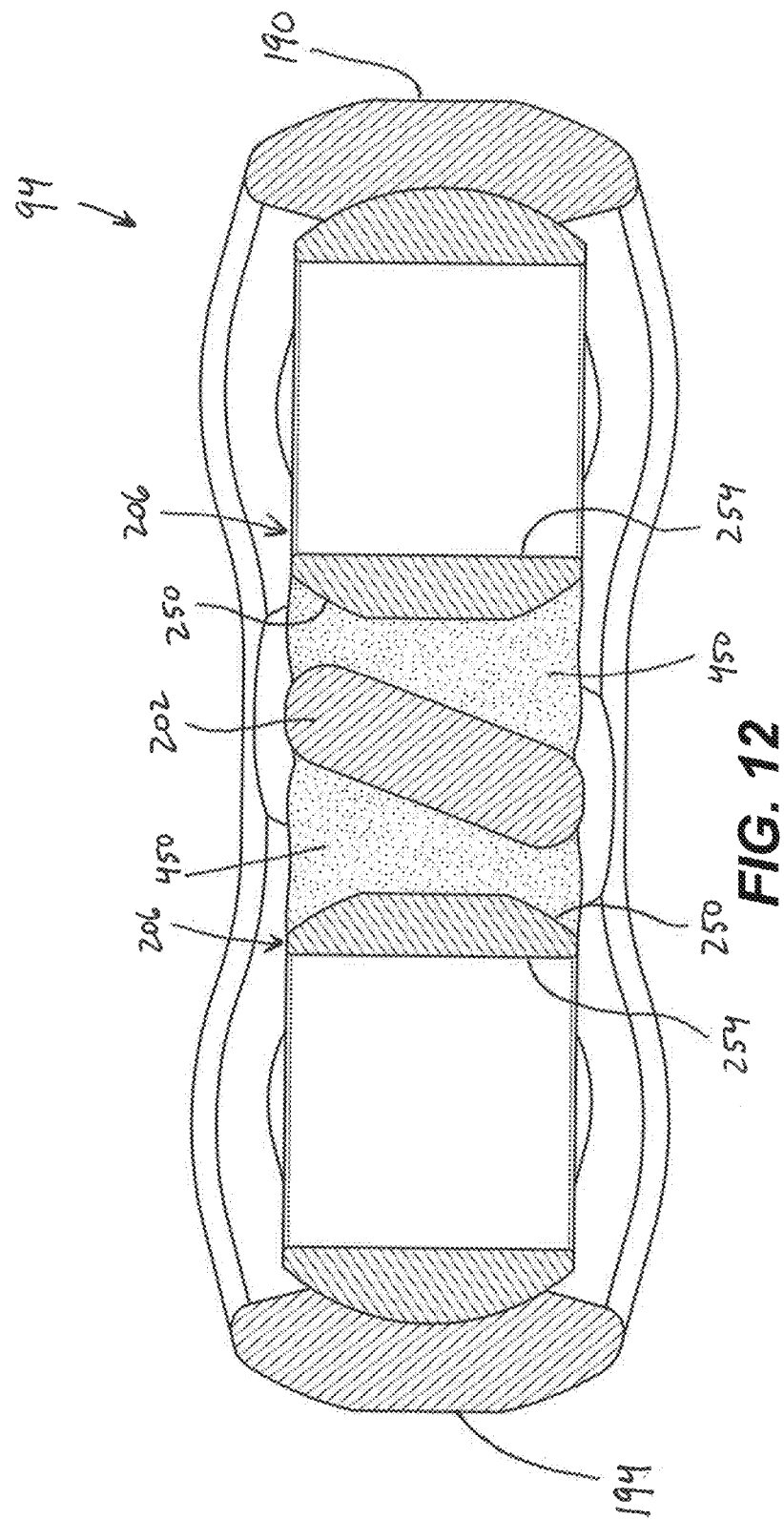
FIG. 12 is a section view of the swivel link of FIG. 10, viewed along section 12-12.

FIGS. 10-12 illustrates a swivel link 94 according to one embodiment. The swivel link 94 includes solid oil 450 filling the void or space between the walls 204, 208 of the swivel link 94 and between each spherical bearing 206 and the reinforcement member 202. The solid oil 450 may be initially in a liquid state when it is applied to the swivel link 94 before solidifying. The solid oil 450 may fill minor surface aberrations to reduce friction. The solid oil 450 may provide solid protection against corrosion while in storage and/or transit, and also provides continuous integral lubrication between chain components during operation. The solid oil 450 also reduces the amount of contaminants permitted to penetrate into interfaces between adjacent chain components.

Figure 13:
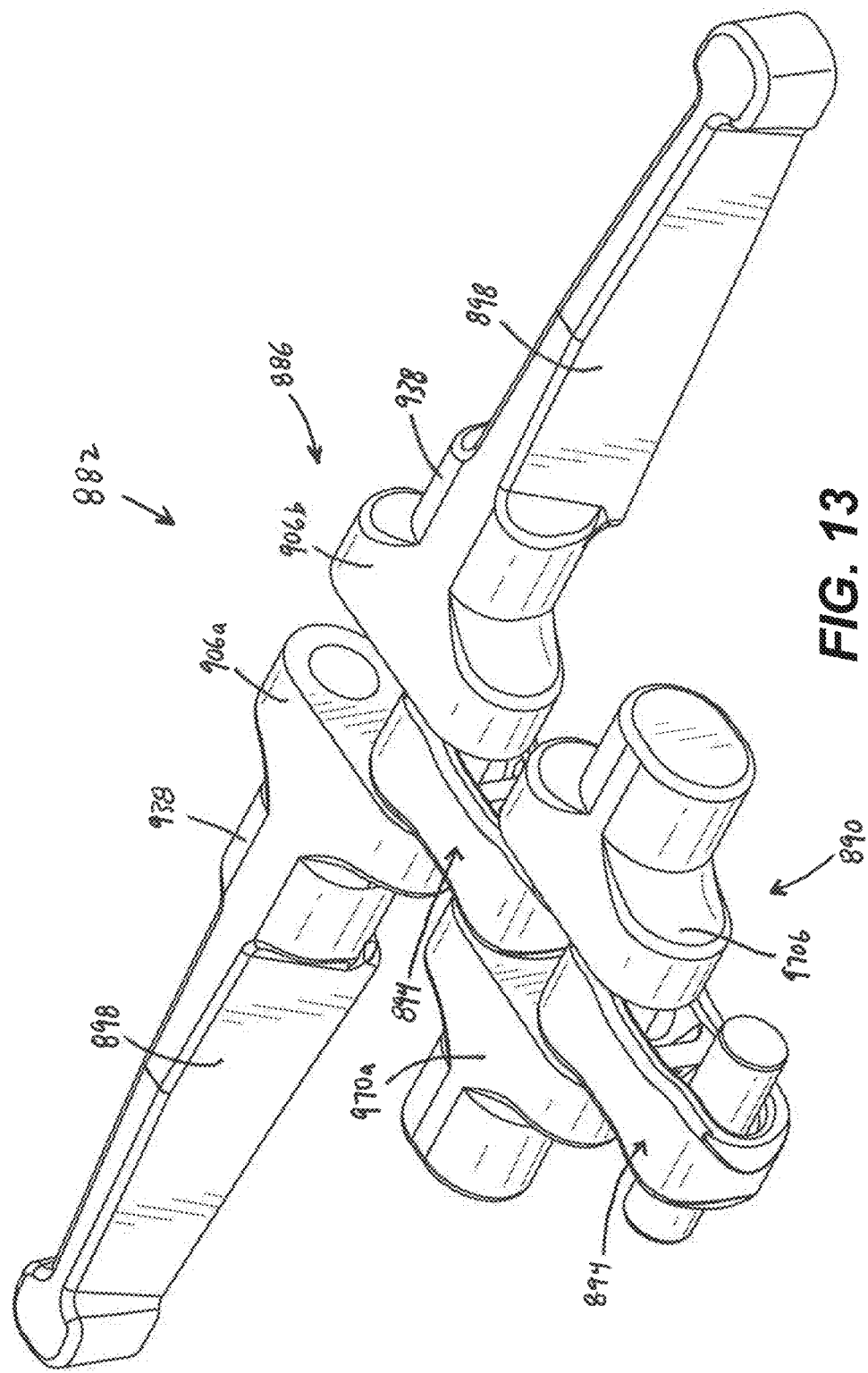
FIG. 13 is a perspective view of a chain conveyor unit according to another embodiment.
Figure 14:
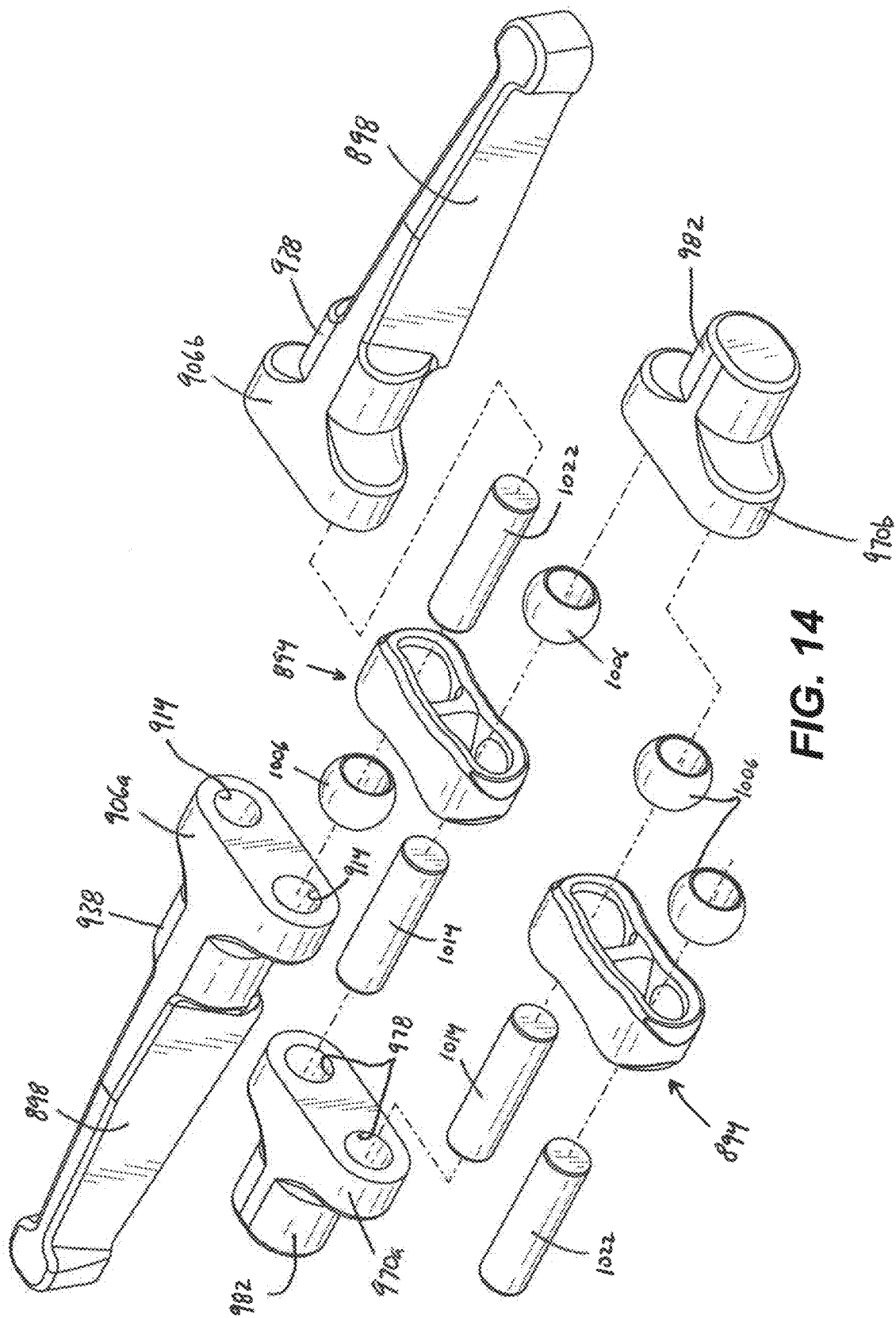
FIG. 14 is an exploded view of the chain conveyor unit of FIG. 13.

FIGS. 13 and 14 illustrate a chain 882 according to another embodiment. Features of the chain 882 are similar to features of the chain 82 and are identified with similar reference numbers, plus 800. At least some differences and/or at least some similarities between the chain 82 and 882 are described below. In addition, components or features described with respect to only one or some of the embodiments described herein are equally applicable to any other embodiments described herein.

The chain 882 includes a flight link 886 including a pair of side portions 906 that are separate from one another and not directly connected. Stated another way, the flight link 886 does not include a bridge between the side portions 906. Rather, the side portions 906 are coupled to one another by the connecting pins 1022 (FIG. 14) extending between the side portion 906 and through a swivel link 894. Similarly, a connecting link 890 includes a pair of side portions 970 that are separate from one another and not directly connected. Stated another way, the connecting link 886 does not include a bridge between the side portions 970, which are formed as separate components 970a, 970b. Rather, the side portions 970 are coupled to one another by the connecting pins 1014 (FIG. 14) extending between the side portion 970 and through the swivel link 894.

In addition, a flight 898 is formed integrally with each side portion 906 of the flight link 886. In the illustrated embodiment, a drive portion 938 protrudes from each side portion 906, and the flight 898 extends laterally outwardly from an end of the drive portion 938. The drive portion 938 is positioned between the side portion 906 and the flight 898. It is understood that aspects of the chain 882 may be incorporated into other disclosed embodiments. For example, an integral flight may be incorporated into the flight link 86 described above with respect to FIGS. 4 and 5.

Although the conveyor is described above with respect to a continuous mining machine, it is understood that the conveyor may be incorporated into other types of machines including but not limited to roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A conveyor chain comprising:
   a first link including a first sprocket-engaging portion and a second sprocket-engaging portion, the first sprocket-engaging portion and the second sprocket-engaging portion each protruding laterally away from one another;
   a second link including a first sprocket-engaging portion and a second sprocket-engaging portion, the first sprocket-engaging portion and the second sprocket-engaging portion of the second link each protruding laterally away from one another; and
   a coupler link coupling the first link to the second link, the coupler link including a first end and a second end, the first end positioned laterally between the first sprocket-engaging portion and the second sprocket-engaging portion of each link, the coupler link further including a lateral opening and a concave pocket, the lateral opening extending through the first end, the concave pocket formed on an inner surface and extending around a portion of the lateral opening, the concave pocket having an at least partially spherical shape, the coupler link further including a bearing positioned in the pocket and having an outer spherical surface, the bearing supporting a connecting pin extending through the lateral opening and engaging the first link, the bearing permitting pivoting movement of the first link about a plurality of axes.

2. The conveyor chain of claim 1, wherein the lateral opening is a first lateral opening, the pocket is a first pocket, and the bearing is a first bearing, wherein the coupler link further includes a second lateral opening extending through the second end, a second concave pocket formed on an inner surface and extending around a portion of the lateral opening, the second pocket having an at least partially spherical shape, the coupler link further including a second bearing positioned in the second pocket and having an outer spherical surface, the second bearing supporting a second connecting pin extending through the second lateral opening and engaging the second link.

3. The conveyor chain of claim 1, wherein a solid lubricant is positioned within at least one of the bearing and the space within the coupler link extending around an outer portion of the bearing.

4. The conveyor chain of claim 1, wherein the coupler link includes a first planar leg extending between the first end and the second end, and a second planar leg extending between the first end and the second end, the second leg being parallel to the first leg, the coupler link further including a gusset connecting the first leg and the second leg and positioned between the first end and the second end, the gusset oriented at an oblique angle relative to a longitudinal axis between the first end and the second end of the coupler link.

5. The conveyor chain of claim 1, wherein the coupler link includes a first planar leg extending between the first end and the second end, and a second planar leg extending between the first end and the second end, the second leg being parallel to the first leg, the first leg and the second leg each including lateral edges having a curved profile to permit pivoting movement of the first link relative to the coupler link.

6. A coupler link for a conveyor chain, the conveyor chain including a first link and a second link, the coupler link comprising:
   a first end;
   a second end;
   a first leg extending between the first end and the second end;
   a second leg extending between the first end and the second end, parallel to the first leg and spaced apart from the first leg to form an interior space between the first end, the second end, the first leg, and the second leg;
   a first concave pocket formed on inner surfaces of the first leg, the first end, and the second leg, the first pocket extending around a portion of the interior space, the first pocket having an at least partially spherical shape;
   a second concave pocket formed on inner surfaces of the first leg, the second end, and the second leg, the second pocket extending around a portion of the interior space, the second pocket having an at least partially spherical shape;
   a first bearing positioned in the first pocket and having a spherical outer surface, the first bearing supporting a first pin for pivoting movement about a plurality of axes relative to the first end, the first pin configured to be coupled to the first link; and
   a second bearing positioned in the second pocket and having a spherical outer surface, the second bearing supporting a second pin for pivoting movement about a plurality of axes relative to the second end, the second pin configured to be coupled to the second link.

7. The coupler link of claim 6, wherein a solid lubricant is positioned within at least one of the first bearing and the second bearing.

8. The coupler link of claim 6, wherein a solid lubricant is positioned within at least one of a space extending around an outer portion of the first bearing and a second space extending around an outer portion of the second bearing.

9. The coupler link of claim 6, wherein a longitudinal axis extends between the first end and the second end, the coupler link further including a gusset connecting the first leg and the second leg and positioned between the first end and the second end, the gusset oriented at an oblique angle relative to the longitudinal axis.

10. The coupler link of claim 6, wherein the first leg and the second leg each include lateral edges having a convex curved profile to permit pivoting movement of the first link relative to the coupler link while limiting lateral translational movement of the coupler link relative to the first link.

11. A coupler link for a conveyor chain, the conveyor chain including a first link and a second link, the coupler link comprising:
   a first end;
   a second end;
   a first leg extending between the first end and the second end;
   a second leg extending between the first end and the second end, parallel to the first leg; and a gusset connecting the first leg and the second leg and positioned between the first end and the second end, the gusset having a planar surface oriented perpendicularly relative to the first leg and the second leg, the planar surface oriented at an oblique angle relative to a longitudinal axis extending between the first end and the second end.

12. The coupler link of claim 11, the gusset partitioning an internal space of the coupler link into a first portion proximate the first end and a second portion proximate the second end, the coupler link further including a first spherical bearing positioned in the first portion and a second spherical bearing positioned in the second portion.

13. The coupler link of claim 12, wherein a solid lubricant is positioned within at least one of the first spherical bearing and the second spherical bearing.

14. The coupler link of claim 12, wherein a solid lubricant is positioned within at least one of a space extending around an outer portion of the first bearing and a second space extending around an outer portion of the second bearing.

15. A conveyor chain comprising:
a first link including a first sprocket-engaging portion and a second sprocket-engaging portion, the first sprocket-engaging portion and the second sprocket-engaging portion each protruding laterally away from one another, the first link further including at least one first end surface;
a second link including a first sprocket-engaging portion and a second sprocket-engaging portion, the first sprocket-engaging portion and the second sprocket-engaging portion of the second link each protruding laterally away from one another, the second link further including at least one second end surface; and
a coupler link positioned laterally between the first sprocket-engaging portion and the second sprocket-engaging portion of each link, the coupler link including a first end and a second end, and a lateral opening extending through the first end, a concave pocket formed on an inner surface and extending around a portion of the lateral opening, the concave pocket having an at least partially spherical shape, the coupler link further including a bearing positioned in the pocket and having an outer spherical surface, the bearing supporting a connecting pin extending through the lateral opening and engaging the first link, the bearing permitting pivoting movement of the first link about a plurality of axes,
wherein one of the at least one second end surface contacts one of the at least one first end surface when at least one of the first link and the second link pivots through a predetermined angle.

16. The conveyor chain of claim 15, wherein the first link includes a pair of parallel side portions and each side portion includes a first end surface, the first sprocket-engaging portion protruding from an outer surface of one of the side portions, the second sprocket-engaging portion protruding from an outer surface of the other of the side portions,
wherein the second link includes a pair of parallel side portions and each side portion includes a second end surface, the first sprocket-engaging portion protruding from an outer surface of one of the side portions of the second link, the second sprocket-engaging portion protruding from an outer surface of the other of the side portions of the second link.

17. The conveyor chain of claim 16, wherein each first end surface is oriented at an oblique angle relative to a direction of travel of the conveyor chain, wherein each second end surface is oriented at an oblique angle relative to the direction of travel of the conveyor chain.

18. The conveyor chain of claim 15, wherein the first portion and the second portion of the first link are connected to one another by a bridge portion integrally formed with the first portion and the second portion.

19. The conveyor chain of claim 15, wherein the first portion and the second portion of the first link are separate from one another.

* * * * *